May 6, 1941.　　　　R. L. HUCKEBA　　　　2,241,133
COTTON CHOPPER
Filed Sept. 9, 1940　　　　3 Sheets-Sheet 2
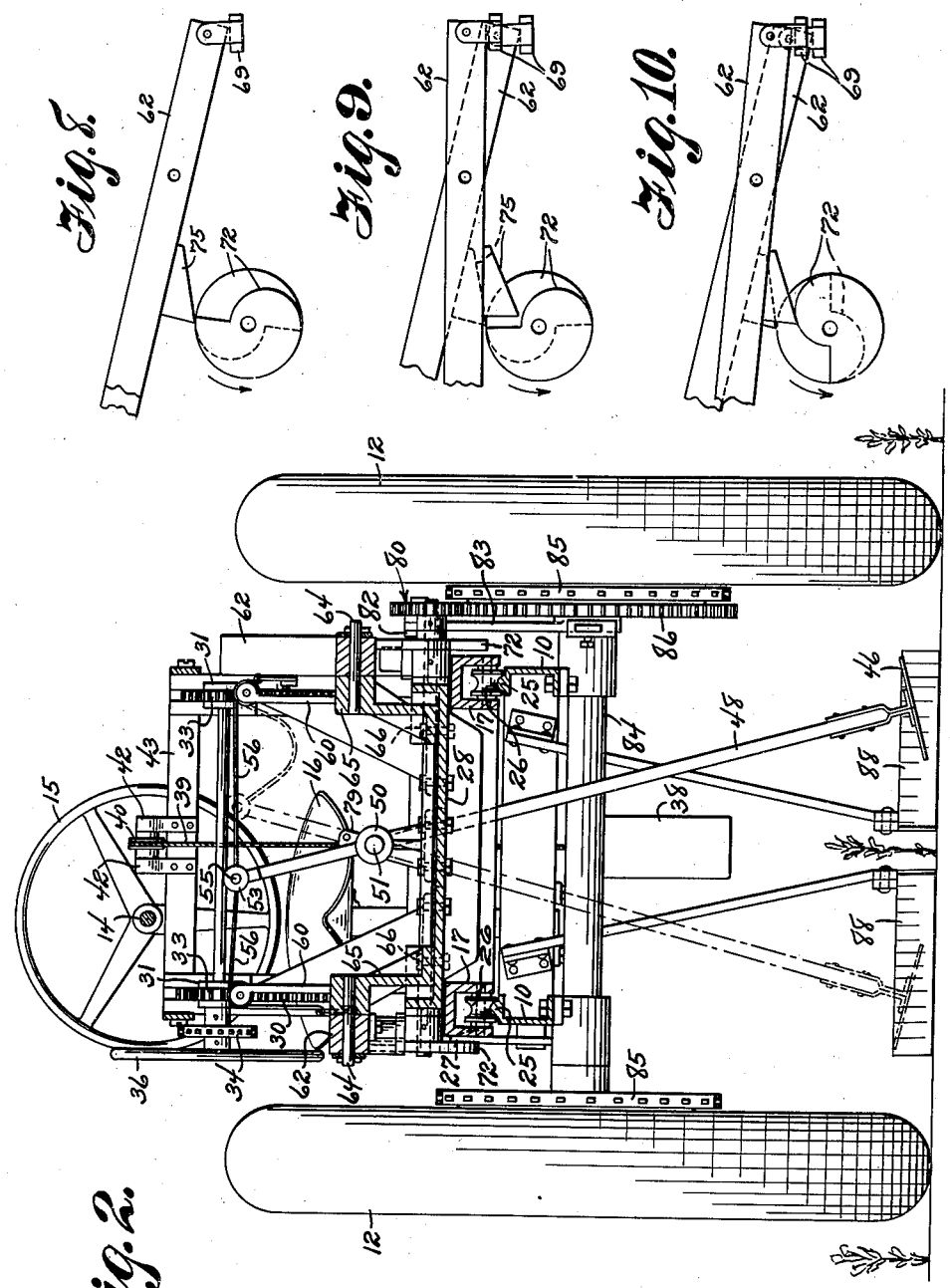
Robert Lee Huckeba
INVENTOR
BY Victor J. Evans & Co.
ATTORNEYS May 6, 1941.  R. L. HUCKEBA  2,241,133
COTTON CHOPPER
Filed Sept. 9, 1940  3 Sheets-Sheet 3
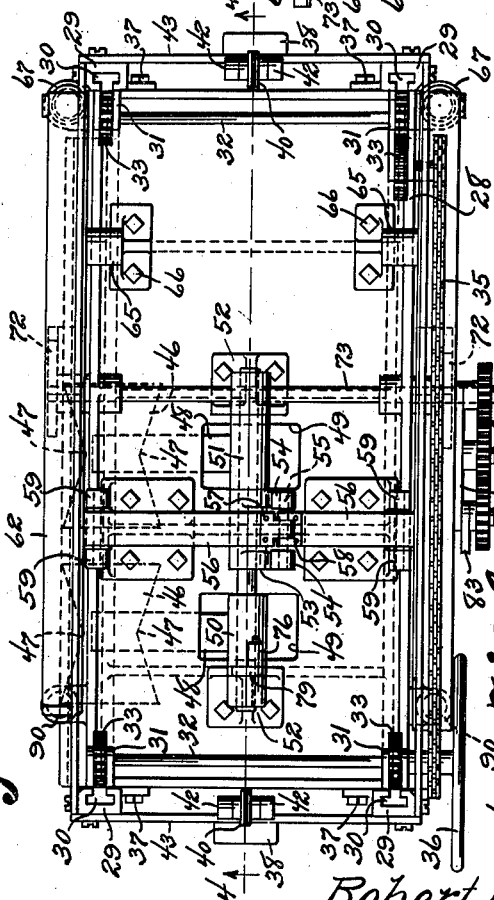
Robert Lee Huckeba INVENTOR
BY Victor J. Evans & Co.
ATTORNEYS Patented May 6, 1941

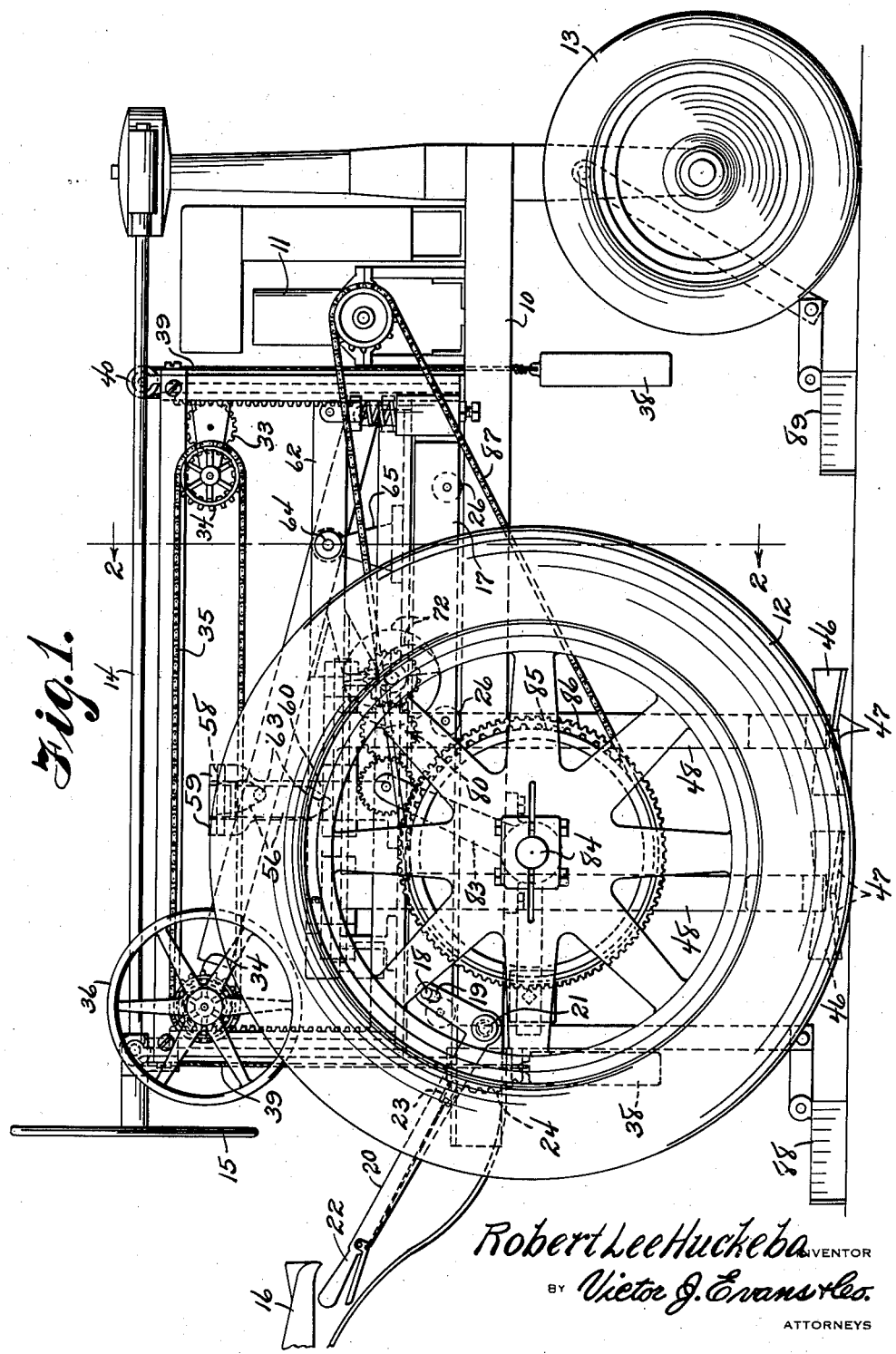

2,241,133

UNITED STATES PATENT OFFICE 2,241,133

COTTON CHOPPER

Robert Lee Huckeba, Aragon, Ga.

Application September 9, 1940, Serial No. 356,053

6 Claims. (Cl. 97—19)

This invention relates to cotton choppers and has for an object to provide a cotton chopper having a carriage which is adjustable longitudinally of the frame to permit the chopping hoes being manually adjusted to operate on irregularly located plants in the row along which the cotton chopper is being propelled.

A further object is to provide a cotton chopper having a cradle, which carries the operating mechanism, adjustable vertically on the carriage for raising and lowering the chopping hoes a desired distance above the ground.

A further object is to provide a cotton chopper having spring operated walking beams controlled by cams which are preferably rotated at a five-to-one ratio relative to the speed of the ground wheels, both walking beams co-acting in swinging the chopping hoes laterally, first from one side of the machine and then from the other side of the machine to chop out pre-determined plants.

A further object is to provide apparatus of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification:

Figure 1 is a side elevation of a cotton chopper constructed in accordance with the invention.

Figure 2 is a cross sectional view of the cotton chopper taken on the line 2—2 of Figure 1.

Figure 3 is a plan view of the cotton chopper with parts removed.

Figure 4 is a longitudinal sectional view of the cotton chopper taken on the line 4—4 of Figure 3.

Figure 5 is an end elevation of the cotton chopper with the cradle in raised position.

Figure 6 is a detail cross sectional view taken on the line 6—6 of Figure 4 and showing the yielding locking means for holding the rear chopping hoe at the end of the edge cutting stroke.

Figure 7 is a detail cross sectional view taken on the line 7—7 of Figure 6.

Figure 8 is a diagrammatic view showing one walking beam in position on its cam just before dropping onto the low side of the cam to permit the controlling spring to actuate the walking beam.

Figure 9 is a diagrammatic view showing relative positions of both walking beams on their cams.

Figure 10 is a diagrammatic view showing the relative positions of both walking beams at a position about ninety degrees angular advance on the cams from that shown in Figure 9.

Referring now to the drawings in which like characters of reference designate similar parts in the various views, 10 designates a frame on which is mounted an internal combustion engine 11, the frame being supported upon rear and front ground wheels 12 and 13, the latter being dirigible and turned by steering mechanism 14 controlled by a hand wheel 15 disposed in front of the operator's seat 16, these being conventional tractor parts.

In carrying out the invention a substantially rectangular carriage is slidably mounted on the frame 10 and at the rear end is provided on one side with a pin 18, best shown in Figure 1, which is received in a slot 19 formed in the end of a bell crank lever 20 which is pivoted at its elbow as shown at 21 on the frame and terminates in a grip 22 near the operator's seat. A latch 23 is carried by the lever and engages a rack 24 carried by the frame 10. Forward or rearward movement of the lever 20 slides the carriage on the frame.

As best shown in Figure 2 the frame 10 and carriage 17 are formed of channel metal. The open side of the channel metal of the frame is turned laterally while the open side of the channel metal of the carriage is turned downwardly. A track 25 is formed by raised ribs on the frame and a plurality of grooved rollers 26, preferably three on each side, as shown in Figure 4, are disposed on respective horizontal shafts 27, secured to the channel metal of the carriage, and engage the track for slidably supporting the carriage on the frame.

A cradle 28 is supported on the carriage, as best shown in Figure 2, and carries the operating mechanism for the chopping hoes. As best shown in Figure 4, the carriage is provided at the four corners with posts 29 which are hollow to provide guides for cradle elevating racks 30. As best shown in Figures 3 and 4, each post is provided with a pair of perforated ears 31 to receive a respective end of a transversely disposed shaft 32, there being pinions 33 fixed to the shafts between the ears. There are two of the shafts 32, one at the front and one at the rear of the machine and both shafts are provided at one end with sprocket gears 34. As best shown in Figure 1, an endless sprocket chain 35 is engaged over the gears. The rear shaft 32 is provided with a cradle elevating wheel 36. When the operator turns the wheel 36, both shafts 32 will be turned to elevate the racks 30 which latter are bolted to the cradle as shown at 37 in Figures 4 and 5.

The weight of the cradle is counterbalanced by two counterbalancing weights 38, best shown in Figure 1, each having a cable 39 trained over a roller 40 carried by a shaft 41 which is journaled in a bearing 42 carried by a respective end bar 43 which connects the upper ends of the guide posts 29. The free ends of the cables are connected to the ends of the cradle, as best shown in Figure 5, preferably by an eye 44 on the cable engaged over a pin 45 on the cradle.

There are two chopping hoes 46, each having opposite longitudinal V-shaped cutting edges 47, as best shown in Figures 2 and 3. A handle 48 is secured to the upper face of each hoe at the center thereof and projects upwardly through a respective opening 49 in the bottom of the cradle. The handle terminates at the upper end in a tubular sleeve 50. The tubular sleeves of the handles are fixed to a hoe shaft 51, best shown in Figure 4, near the ends thereof so that when the shaft is oscillated both chopping hoes are swung as a unit pendulum-like from one side of the machine to the opposite side and then swung back again as the machine is propelled along a row of plants to chop out pre-determined plants. The ends of the hoe shaft are journaled in bearing brackets 52 which are mounted on the bottom of the cradle.

For oscillating the hoe shaft an oscillating arm 53, best shown in Figures 3 and 5, is fixed to the hoe shaft 50 and extends upwardly in the plane of the hoe handles 48. The upper end of the arm is bifurcated and the branches terminate in alined eyes 54, best shown in Figure 3, through which a pin 55 is passed to secure the ends of straps 56 to the oscillating arm. The straps 56 extend transversely across the cradle and have interfitting perforated ears 57 and 58 which receive the pin 55, the outer ends of the straps being engaged over respective pulleys, best shown in Figure 4, each of which is secured to a respective shaft 58 which is mounted in bearings 59 disposed on the upper end of a bracket 60 which is bolted to the bottom of the cradle as shown at 61. The outer end of the strap is secured to a respective walking beam 62 by a pin 63 so that when the walking beams are actuated one strap will be pulled and the other slacked off to swing the oscillating arm.

There are two walking beams 62 disposed longitudinally of the cradle at respective opposite sides thereof, as best shown in Figures 3 and 5. Each walking beam is pivoted near one end, as best shown in Figure 4, by a pivot pin 64 engaged in a bearing bracket 65, best shown in Figure 2, which is bolted to the cradle as shown at 66.

Each walking beam is actuated on its working stroke by a helical spring 67, best shown in Figure 5, which is disposed in a housing 68 carried by the cradle 28 and located under the front end of the walking beam. The spring bears against a shoe 69 on the underneath face of the walking beam. The tension of the spring is adjusted by an adjusting screw 70 engaged through the bottom of the housing and bearing against a pressure plate 71 upon which the bottom of the spring is supported.

When one of the springs expands, the front end of the respective walking beam is raised and the rear end lowered to pull on the respective strap 56 and quickly snap both chopping hoes through a pendulum-like arc as a unit across the row of plants from which pre-determined plants are to be chopped off. The release of the springs alternately is timed by a pair of cams 72 arranged underneath respective walking beams and fixed to a cam shaft 73 which is journaled in bearings 74, best shown in Figure 4, disposed on the bottom of the cradle 28. The cams engage triangular shoes 75 disposed upon the underneath faces of the walking beams on the opposite side of the pivots of the walking beams from the shoes 69.

Each walking beam shoe 75 drops vertically one-half the diameter of its cam from the high side of the cam onto the low side of the cam once during each revolution of the cam. The low sides of both cams are disposed oppositely to each other so that when the shoe of one walking beam is riding on the high side of its cam the shoe of the other walking beam will be riding on the low side of its cam. When the shoe of one walking beam drops from the high side onto the low side of the cam the controlling spring of that walking beam, compressed by the walking beam while the shoe of the walking beam was riding on the high side of the cam, is freed, and quickly expands to raise the front end of the walking beam and lower the rear end of the walking beam thereby pulling the respective strap 56 to rock the oscillated arm 53 and swing both chopping hoes 46 as a unit across the row of plants. Meanwhile, the shoe of the mating walking beam is riding on the high side of its cam and holding the respective strap 56 slack as shown by dotted lines in Figure 2 to permit the actuation of the chopping hoes just described.

To prevent the chopping hoes from gravitating from their limit of stroke, as best shown in Figure 7, the sleeve 50 of the rearmost hoe is provided with a recessed lug 76 carrying a spring-pressed detent 77 which enters a socket 78, formed in a projection 79 on the rear bearing bracket 52 of the hoe shaft 51, at the limit of stroke of the hoe. The detent holds both hoes quiescent, since both are attached to a common shaft 51, until rotation of the cams releases the spring of a walking beam to swing both hoes through an arc back across the row of plants.

Timing of the actuation of the walking beams is accomplished by a gear train designated in general by the numeral 80 and best shown in Figures 1 and 3, the gear at the front end of the train being secured to the cam shaft 73. The gears of the gear train are secured to respective stub shafts 81 carried by a bar 82 which is pivotally mounted at the front end on the cam shaft and which is pivotally connected at the rear end to an inclined lever 83 which is pivoted on the axle 84 of the rear ground wheels, as best shown in Figure 1. The final gear of the gear train meshes with a gear 85 which is integral with a sprocket gear 86. The sprocket gear is fixed to one of the independently driven rear ground wheels 12 of the machine. A sprocket chain drive 87 connects the sprocket gear to be driven by the motor.

By virtue of the pivotal mounting of the gear arms 82 and 83 the rear gear of the gear train will remain meshed with the driving gear 85 during vertical adjustment of the cradle.

Conventional scrapers 88 are secured to the rear end of the frame 10 and conventional scrapers 89 are secured to the front dirigible structure of the machine.

Preferably the ratio of the gear train to the driving gear 85 is one-to-five so that for every ten-foot advance of the machine the chopping hoes will be actuated each two feet to chop out plants since the cams will be rotated through five complete revolutions while the driving gear is making one complete revolution. In the event some of the plants in the row have died the operator need only actuate the carriage controlling lever 20 to move the carriage forwardly or rearwardly and thus re-arrange the chopping hoes to compensate for this irregularity.

To cushion the shock of the descending free ends of the walking beams rubber bumpers 90, best shown in Figure 4, are secured in metal sockets 91 carried by the cradle.

Since the operation of the parts has been described as the description of the parts progressed, it is thought the invention will be fully understood without further explanation.

What is claimed is:

1. In a cotton chopper, the combination with a tractor having a frame, of a carriage slidably mounted on the frame, means for holding the carriage at adjusted positions of its sliding movement on the frame, a cradle mounted for vertical adjustment on the carriage, a chopping hoe having a handle projecting upwardly through the frame and through the carriage, means carried by the cradle and connected to the handle for swinging the hoe pendulum-like in an arc across a row of plants from which selected plants are to be chopped, and means for timing the actuation of the oscillating means actuated by a rotating part of the tractor.

2. In a cotton chopper, the combination with a tractor having a frame, of a carriage slidably mounted on the frame, means for holding the carriage at adjusted positions of its sliding movement on the frame, a cradle mounted for vertical adjustment on the carriage, a chopping hoe having a handle projecting upwardly through the frame and through the carriage, an oscillating lever connected to the hoe for actuating the hoe, a pair of walking beams on the cradle, compression springs for actuating the walking beams, cams alternately releasing the walking beams to be moved by their springs, and straps connected to the oscillating lever and to the walking beams adapted to be alternately pulled laterally to actuate the oscillating lever to actuate the hoe.

3. In a cotton chopper, the combination with a tractor having a frame, of a carriage slidably mounted on the frame, guide posts rising from the carriage, a cradle on the carriage, racks connected to the cradle engaged with the guide posts, pinions carried by the posts engaging the racks, means for driving the pinions to raise and lower the racks for mounting the cradle for vertical adjustment on the carriage, a chopping hoe having a handle projecting upwardly through the frame and through the carriage, means carried by the cradle and connected to the handle for swinging the hoe pendulum-like in an arc across a row of plants from which selected plants are to be chopped, and means for timing the actuation of the oscillating means actuated by a rotating part of the tractor.

4. In a cotton chopper, the combination with a tractor having a frame, of a carriage slidably mounted on the frame, guide posts rising from the carriage, a cradle on the carriage, racks connected to the cradle engaged with the guide posts, pinions carried by the posts engaging the racks, means for rotating the pinions to raise and lower the racks for moving the cradle vertically on the carriage, a chopping hoe having a handle projecting upwardly through the frame and through the carriage, an oscillating lever connected to the hoe for actuating the hoe, a pair of walking beams on the cradle, compression springs for actuating the walking beams, cams alternately releasing the walking beams to be moved by their springs, and straps connected to the oscillating lever and to the walking beams adapted to be alternately pulled laterally to actuate the oscillating lever.

5. In a cotton chopper the combination with a tractor having a frame, of a carriage superposed on the frame, a track on the frame, grooved rollers on the carriage engaging the track for slidably mounting the carriage longitudinally of the frame, a bell crank lever connected to the carriage for adjusting the carriage longitudinally of the frame, latching means between the bell crank lever and frame for holding the carriage in adjusted positions, a cradle mounted for vertical adjustment on the carriage, a chopping hoe having a handle projecting upwardly through the frame and through the carriage, means carried by the cradle and connected to the handle for swinging the hoe pendulum-like in an arc across a row of plants from which selected plants are to be chopped, and means for timing the actuation by the oscillating means actuated by a rotating part of the tractor.

6. In a cotton chopper, the combination with a tractor having a frame, of a carriage slidably mounted on the frame, guide posts rising from the carriage, a cradle on the carriage, racks connected to the cradle engaged with the guide posts, rotatable pinions engaging the racks for moving the cradle vertically on the carriage, front and rear cross bars connecting the tops of the posts together, pulleys on the cross bars, counter-balancing weights having cables trained over said pulleys and connected to the cradle, a manually operable chain drive for rotating the pinions, a chopping hoe having a handle projecting upwardly through the frame and through the carriage, means carried by the cradle and connected to the handle for swinging the hoe pendulum-like in an arc across a row of plants from which selected plants are to be chopped, and means for timing the actuation of the oscillating means actuated by a rotating part of the tractor.

ROBERT LEE HUCKEBA.